United States Patent Office 2,851,452
Patented Sept. 9, 1958

2,851,452
PROCESS OF PREPARING DIAZOAMINO COMPOUNDS

Kurt Breig, Koln-Stammheim, and Eugen Glietenberg, Leverkusen-Bayerwerk, Germany, assignors to Farbenfabriken Bayer Aktiengesellschaft, Leverkusen, Germany, a corporation of Germany No Drawing. Application May 16, 1956
Serial No. 585,161

Claims priority, application Germany June 30, 1955

5 Claims. (Cl. 260—140)

The present invention relates to a process of preparing diazoamino compounds.

Diazoamino compounds of diazotized aromatic amines without solubilizing groups and so-called stabilizers containing water solubilizing groups are usually prepared by reacting the diazo compound with the stabilizer in soda-alkaline medium and, if necessary, salting out the reaction product. This process, however, fails if as amines weakly negatively substituted aromatic amines and as stabilizers alkylamino-sulfobenzoic acids are used. Thus the diazo compounds of more weakly negatively substituted amines of the benzene series without solubilizing groups as e. g. monohalogeno-anilines, monohalogeno-toluidines, monohalogeno-anisidines, dihalogeno-anilines, dihalogeno-toluidines, nitrohalogeno-anisidines and nitrohalogeno-toluidines and alkylamino-sulfobenzoic acids can indeed be combined in the usual manner by coupling in soda-alkaline medium, but it is not possible to separate the diazoamino compounds from the coupling solutions by the usual addition of salt.

In accordance with the present invention it has been found that diazoamino compounds obtained from weakly negatively substituted aromatic amine without water-soluble groups and alkylamino-sulfobenzoic acids as stabilizers can be easily isolated by precipitating them in form of their alkaline-earth metal salts.

In practicing the invention an alkaline-earth metal salt may be added to the coupling mixture in form of the alkaline-earth metal salt of the alkylamino sulfobenzoic acid used as stabilizer, or as alkaline-earth carbonate instead of sodium carbonate in order to neutralize the free acid which is liberated during the coupling; an alkaline-earth metal salt can also be added in form of e. g. CaCl$_2$, SrCl$_2$ or BaCl$_2$ when the coupling process is complete. By this process the said diazoamino compounds, which cannot be separated by mere addition of common salt, can be isolated easily by adding common salt and are obtained as alkaline-earth metal salts which can be easily filtered.

The diazoamino compounds thus obtained have the advantage of being split very rapidly on neutral steaming. Therefore they are in particular suitable for producing so-called ice colors in textile printing. When printed together with vat dyes strong and clear dyeings are obtained which are almost insensitive against reducing agents.

The following examples are given for the purpose of illustrating the invention, without, however, limiting it thereto.

*Example 1*

41 g. of 1-amino-2-methyl-5-chlorobenzene are stirred with 175 cc. of water and 80 cc. of hydrochloric acid (36% by volume) and diazotized in the usual manner with 67 cc. of 30% sodium nitrite solution at 0–5° C. The clear diazonium salt solution is run within 45 minutes with good stirring at 0–5° C. into a solution of 90 g. of 2-ethylamino-5-sulfobenzoic acid in 100 cc. of water, 50 cc. of sodium hydroxide solution (36° Bé.) and 70 g. of solid sodium carbonate. After the coupling is complete, 50 cc. of sodium hydroxide solution and, thereafter, 200 g. of fine-grained anhydrous calcium chloride are added to the solution. The instantaneously starting precipitation of the calcium salt of the diazoamino compound is completed by the addition of 50 g. of sodium chloride to the reaction solution.

*Example 2*

45.7 g. of 1-amino-2-methoxy-5-chlorobenzene are diazotized as described in Example 1 and coupled with 2-ethylamino-5-sulfobenzoic acid. 50 cc. of concentrated sodium hydroxide solution, 50 g. of sodium chloride and subsequently 200 g. of anhydrous calcium chloride are added to the coupling solution. After the reaction mixture has been stirred overnight, the diazoamino compound has completely precipitated in the form of calcium salt.

*Example 3*

41 g. of 1-amino-2-methyl-4-chlorobenzene are diazotized as described in Example 1 and coupled with 2-ethylamino-5-sulfobenzoic acid. After completion of the coupling process the clear solution is mixed with 50 cc. of sodium hydroxide solution and then with 170 g. of strontium chloride. By addition of 50 g. of sodium chloride and after stirring overnight, the strontium salt of the diazoamino compound has completely precipitated in a readily filterable form.

*Example 4*

45 g. of 1-amino-2-methoxy-4-nitrobenzene are stirred with 80 cc. of hydrochloric acid (36% by volume) and 100 cc. of water. The mixture is diazotized with 67 cc. of sodium nitrite solution (30%) while cooling with ice at 0–5° C. The thus obtained clear diazonium salt solution is run within 45 minutes with good stirring at 0–5° C. into the solution of 90 g. of 2-ethylamino-5-sulfobenzoic acid in 100 cc. of water, 50 cc. of sodium hydroxide solution (36° Bé.) and 70 g. of solid sodium carbonate. After stirring for 60 minutes the coupling is complete; 50 cc. of concentrated sodium hydroxide solution, 100 g. of anhydrous calcium chloride and 120 g. of sodium chloride are then added to the coupling solution. After stirring overnight the calcium salt of the diazoamino compound precipitates completely in a readily filterable form.

*Example 5*

47 g. of 2,5-dichloroaniline are stirred overnight with 160 cc. of concentrated hydrochloric acid (36% by volume). The mixture is cooled to 0–5° C. by addition of ice and then diazotized with 67 cc. of sodium nitrite solution (30%). After stirring for two hours the diazonium salt solution is filtered and slowly added to a solution (which has been cooled to 0–5° C. by addition of ice) of 140 g. of 2-isopropylamino-5-sulfobenzoic acid in 200 cc. of water, 60 cc. of concentrated sodium hydroxide solution, 100 g. of sodium acetate and 60 g. of sodium chloride. After the coupling is nearly complete, the solution is rendered alkaline with concentrated sodium hydroxide solution. Thereupon 200 g. of solid barium chloride and 90 g. of sodium chloride are added. By stirring the solution overnight, the barium salt of the diazoamino compound precipitates and can easily be isolated.

*Example 6*

37 g. of 1-amino-3-chlorobenzene are diazotized as described in Example 1. The clear diazonium salt solution is run within one hour with good stirring at 0–5° C. into a solution of 140 g. of 2-isopropylamino-5-sulfobenzoic acid in 200 cc. of water, 50 cc. of sodium hydroxide solution and 70 g. of solid sodium carbonate.

After two hours' stirring 50 cc. of concentrated sodium hydroxide solution, 200 g. of anhydrous calcium chloride and 75 g. of sodium chloride are added to the coupling solution. After stirring overnight the calcium salt of the diazoamino compound has precipitated and can be filtered off with suction.

*Example 7*

41 g. (0.29 mol) of 1-amino-2-methyl-5-chlorobenzene are stirred with 175 cc. of water and 80 cc. of hydrochloric acid (36% by volume) and diazotized as usual with 67 cc. of 30% sodium nitrite solution at 0–5° C. The diazonium salt solution is slowly run into a solution of 90.5 g. (0.32 mol) of the calcium salt of 2-ethylamino-5-sulfobenzoic acid in 100 cc. of water and 30 cc. of ammonia solution (25%). The reaction of the diazo compound proceeds rapidly; after stirring the coupling solution for two hours the diazoamino compound is isolated as calcium salt, which can easily be filtered, by addition of sodium chloride.

If using instead of diazotized 1-amino-2-methyl-5-chloro-benzene diazotized 1-amino-3-chlorobenzene or 1-amino-2,5-dichlorobenzene and coupling these diazo compounds with the calcium salt of 2-ethylamino-5-sulfobenzoic acid, the calcium salts of the corresponding diazoamino compounds are obtained which can be isolated easily by addition of salt.

*Example 8*

49 g. (0.29 mol) of 1-amino-2-methoxy-4-nitrobenzene are diazotized as described in Example 1. The clear diazonium salt solution and 60 cc. of concentrated ammonia solution are simultaneously introduced into a solution of 90.5 g. (0.32 mol) of the calcium salt of 2-ethylamino-5-sulfobenzoic acid in 100 cc. of water. After the coupling process is complete, the solution is purified by filtration. The calcium salt of the diazoamino compound can be isolated by addition of sodium chloride.

*Example 9*

49 g. (0.29 mol) of 1-amino-2-methoxy-4-nitrobenzene are diazotized as described in Example 1. The diazonium salt solution is slowly introduced into a suspension of 40 g. of calcium carbonate in a solution containing 92 g. (0.32 mol) of the disodium salt of 2-ethylamino-5-sulfobenzoic acid. After the coupling process is complete, the mixture is rendered triazene alkaline with some caustic soda solution and filtered. The calcium salt of the diazoamino compound can be isolated from the filtrate in good yield by addition of sodium chloride.

We claim:
1. In the process for preparing a diazoamino compound obtained from a diazotized weakly negatively substituted aromatic amine of the benzene series without water solubilizing groups and a lower alkylamino-sulfobenzoic acid as stabilizer the improvement which comprises precipitating the diazoamino compound as alkaline-earth metal salt of the group consisting of calcium, strontium and barium salts.

2. In the process for preparing a diazoamino compound obtained from a diazotized weakly negatively substituted aromatic amine of the benzene series without water solubilizing groups and a lower alkylamino-sulfobenzoic acid as stabilizer the improvement which comprises precipitating the diazoamino compound as alkaline-earth metal salt of the group consisting of calcium, strontium and barium salts by using the alkaline-earth metal salt of the alkylamino-sulfobenzoic acid as stabilizer.

3. In the process for preparing a diazoamino compound obtained from a diazotized weakly negatively substituted aromatic amine of the benzene series without water solubilizing groups and a lower alkylamino-sulfobenzoic acid as stabilizer the improvement which comprises precipitating the diazoamino compound by adding alkaline-earth carbonate of the group consisting of calcium, strontium and barium carbonates to the coupling mixture.

4. In the process for preparing a diazoamino compound obtained from a diazotized weakly negatively substituted aromatic amine of the benzene series without water solubilizing groups and a lower alkylamino-sulfobenzoic acid as stabilizer the improvement which comprises precipitating the diazoamino compound by adding a watersoluble alkaline-earth metal salt of the group consisting of calcium, strontium and barium salts to the coupling mixture.

5. In the process for preparing a diazoamino compound obtained from a diazotized weakly negatively substituted aromatic amine of the benzene series without water solubilizing groups and a lower alkylamino-sulfobenzoic acid as stabilizer the improvement which comprises precipitating the diazoamino compound by adding a watersoluble alkaline-earth metal salt of the group consisting of calcium, strontium and barium salts and sodium chloride to the coupling mixture.

References Cited in the file of this patent

UNITED STATES PATENTS

| | | |
|---|---|---|
| 2,168,800 | Kracker et al. | Aug. 8, 1939 |
| 2,522,838 | Petitcolas et al. | Sept. 19, 1950 |